(12) United States Patent
Antoine

(10) Patent No.: US 12,114,640 B2
(45) Date of Patent: Oct. 15, 2024

(54) IDENTIFICATION EAR TAG FOR ANIMALS, COMPRISING A PART INCORPORATING A PART OF A UHF IDENTIFICATION SYSTEM AND A PART CONFIGURED TO PRESS AND KEEP THE UHF PART APPLIED AGAINST AN EAR OF THE ANIMAL

(71) Applicant: ARDES, Saint Chef (FR)

(72) Inventor: Albert Antoine, Bourgoin Jallieu (FR)

(73) Assignee: ARDES, Saint Chef (FR)

( * ) Notice: Subject to any disclaimer, the term of this patent is extended or adjusted under 35 U.S.C. 154(b) by 176 days.

(21) Appl. No.: 17/597,276

(22) PCT Filed: Jul. 2, 2020

(86) PCT No.: PCT/EP2020/068678
§ 371 (c)(1),
(2) Date: Dec. 30, 2021

(87) PCT Pub. No.: WO2021/001481
PCT Pub. Date: Jan. 7, 2021

(65) Prior Publication Data
US 2022/0312728 A1   Oct. 6, 2022

(30) Foreign Application Priority Data

Jul. 2, 2019   (FR) ...................................... 1907344

(51) Int. Cl.
*G09F 3/00*   (2006.01)
*A01K 11/00*   (2006.01)
*A01K 29/00*   (2006.01)
*B29C 70/68*   (2006.01)

(52) U.S. Cl.
CPC .................................. *A01K 11/004* (2013.01)

(58) Field of Classification Search
CPC .. A01K 29/005; A01K 11/006; A01K 11/001; A01K 11/004; G09F 3/12
See application file for complete search history.

(56) References Cited

U.S. PATENT DOCUMENTS

| 5,588,234 | A | 12/1996 | De Jong et al. | |
| 8,701,317 | B2* | 4/2014 | Le Devehat | G09F 3/12 |
| | | | | 40/302 |
| 9,038,293 | B2* | 5/2015 | Decaluwe | B29C 45/14639 |
| | | | | 119/859 |

(Continued)

FOREIGN PATENT DOCUMENTS

| EP | 0 589 533 | A1 | 3/1994 |
| KR | 101204277 | B1 | 11/2012 |

(Continued)

OTHER PUBLICATIONS

International Search Report for corresponding International Application No. PCT/EP2020/068678 mailed Sep. 11, 2020.

(Continued)

*Primary Examiner* — Shin H Kim
(74) *Attorney, Agent, or Firm* — Pearne & Gordon LLP

(57) ABSTRACT

The invention includes an electronic animal tag of two pieces, one incorporating the UHF, and preferably RFID, electronic identification portion, the other incorporating means that will press the UHF portion against the ear of an animal and keep it pressed there throughout its lifetime.

13 Claims, 7 Drawing Sheets

(56) References Cited

U.S. PATENT DOCUMENTS

| | | | |
|---|---|---|---|
| 9,147,151 B2* | 9/2015 | Robadey | G06K 19/07758 |
| 10,021,857 B2* | 7/2018 | Bailey | B32B 7/04 |
| 10,779,510 B1 | 9/2020 | Moss et al. | |
| 11,191,626 B1* | 12/2021 | Brandao | A01K 11/001 |
| 2007/0199215 A1* | 8/2007 | Gardner | A01K 11/001 |
| | | | 40/301 |
| 2011/0203144 A1* | 8/2011 | Junek | G06K 19/04 |
| | | | 40/300 |
| 2012/0102802 A1* | 5/2012 | Lodi | G09F 3/207 |
| | | | 40/662 |
| 2013/0247433 A1* | 9/2013 | Le Devehat | A01K 11/004 |
| | | | 40/302 |
| 2015/0068077 A1* | 3/2015 | Robadey | G06K 19/07758 |
| | | | 40/301 |
| 2018/0007863 A1* | 1/2018 | Bailey | B32B 15/20 |
| 2021/0212288 A1* | 7/2021 | Smith | A01K 11/001 |
| 2022/0047367 A1* | 2/2022 | Brandao | A01K 11/001 |
| 2022/0312728 A1* | 10/2022 | Antoine | A01K 11/004 |
| 2023/0210087 A1* | 7/2023 | Teychene | A61B 10/0096 |
| | | | 40/301 |

FOREIGN PATENT DOCUMENTS

| | | |
|---|---|---|
| NL | 9101468 A | 3/1993 |
| WO | 2011/153571 A2 | 12/2011 |
| WO | 2019/071222 A1 | 4/2019 |

OTHER PUBLICATIONS

Written Opinion for corresponding International Application No. PCT/EP2020/068678 dated Sep. 11, 2020.

French Search Report for corresponding French Application No. FR1907344 dated Feb. 20, 2020.

* cited by examiner

IDENTIFICATION EAR TAG FOR ANIMALS, COMPRISING A PART INCORPORATING A PART OF A UHF IDENTIFICATION SYSTEM AND A PART CONFIGURED TO PRESS AND KEEP THE UHF PART APPLIED AGAINST AN EAR OF THE ANIMAL

TECHNICAL FIELD

The present invention relates to the field of identification ear tags for animals, in particular herd animals.

It more particularly relates to a so-called electronic identification tag, i.e. a tag via which UHF electronic identification, and more particularly radio-frequency electronic identification (RFID), is implemented.

The invention is generally applicable to herd animals of any type, such as pigs, cattle, sheep, goats, and any type of domestic animal.

One advantageous application is the identification of each animal of a herd.

PRIOR ART

In the field of identification of members of a herd and of other domestic animals, it is known to use plastic ear tags.

The identification ear tag may take various forms. For example, it may take the form of a flag and may comprise a male portion and a female portion that are joined together on an ear of an animal, or another form of coupling configured to pierce and to be fastened to the ear of the animal.

When an identification tag comprises a male portion and a female portion, the male portion comprises a shaft with a tip configured to pierce the ear of the animal and to fasten the tag to the ear.

At least one portion of an identification tag has a surface on which the identification details are written or printed or even adhesively bonded, with a high degree of legibility, in the form of numbers and/or letters. The surface must be planar, in order to allow the identification information to be easily read visually.

All these conventional identification tags are therefore tags that are read solely visually.

Another category of identification tags employs electronic identification, this having the major advantage of allowing the tags to be read more simply and rapidly than visual tags and above all of systematizing and automating animal traceability. This is especially advantageous for herd animals when the herds contain a very high number of animals.

These so-called electronic identification tags may thus include an RFID transponder that stores in memory an electronic version of the alphanumeric identification code, or additional information regarding the animal and that may communicate by RFID with an automatic reader/transmitter.

The RFID communications sent and/or received by electronic tags must comply with international standards, such as the standards ISO 11784 and ISO 11785 or ISO/CEI 18000-6C, regarding signals in the UHF spectrum (from 865 to 868 MHz and generally 866 MHz in Europe, from 902 MHz to 928 MHz and generally 915 MHz in America, and from 950 to 956 MHz in Asia and Oceania) or low-frequency signals (frequency of 134.2 kHz).

An RFID transponder incorporated into an electronic tag generally comprises a send/receive antenna and a microchip (electronic chip) connected to the antenna, which electronic component performs one or more relatively complex electronic functions.

For the purposes of mechanical protection and fraud prevention, the antenna and the microchip are conventionally encapsulated in the plastic from which one portion of an ear tag is made, this portion for example lying in a planar region of the tag.

A plurality of methods for producing an RFID transponder and for assembling it into the planar region of the ear tag are known.

For example, according to a first known method, the transponder is made up of an electronic chip and of a ring-shaped silicon microcircuit that bears the chip, and an annular capsule made of plastic, typically polyurethane, protects the transponder from the exterior, even under the demanding wetness and dirtiness conditions that can conventionally be encountered in farming cattle, sheep, goats, pigs and other domestic animals.

According to another method, a UHF send/receive spectrum antenna and the microchip are adhesively bonded to, etched into or welded to a separate film, which is generally made of polyethylene terephthalate (PET), which is then joined to the plastic substrate by adhesively bonding or welding the tag before encapsulation, typically by ultrasonic welding, of the rest of the plastic of the ear tag.

An electronic tag according to this other method has the advantage of being lighter than a tag according to the aforementioned first method.

The applicant has observed that one major drawback of currently available electronic tags that emit/receive in the UHF spectrum is that, over their lifetime, their performance may vary randomly and they may even stop working.

Specifically, depending on the position of the transponder with respect to the animal, it has been observed that the signals sent/received by electronic tags may undergo modification that may be prohibitive for the send/receive distances calibrated with the fixed reader/transmitter.

International patent application WO2019/071222 discloses an electronic identification ear tag for farmed pigs comprising a female portion and a male portion, the casing of which houses an electro-optical sensor (photoplethysmography sensor) for recording the heartbeat of the pig, an accelerometer and a wireless (RFID, Bluetooth, etc.) transmission system for transmitting the data of the sensor and accelerometer. This ear tag is very heavy and bulky because of the electronic components employed and the associated casing, and thus cannot be said to be truly suitable for young animals and/or animals with fragile ears.

There is therefore a need to improve electronic identification ear tags for animals, in particular in order to mitigate the aforementioned major drawback.

Another need is to provide an electronic identification tag for animals that is light and not very bulky in order that it may be easily tolerated by animals.

The aim of the invention is to at least partially meet this need or these needs.

SUMMARY OF THE INVENTION

To this end, the invention relates, according to one of its aspects, to an identification ear tag for animals, comprising:
 a male portion comprising a shaft with a tip configured to configured to pierce an animal ear and to fasten the tag to the ear;
 a female portion, intended to be fastened around the shaft, wherein:
the male portion or the female portion incorporates one portion of a UHF identification system and the male portion or the female portion is configured to press the UHF identification portion against the ear of the animal during fastening of the tip, and to keep it pressed against the ear, without exterior intervention, no matter how the latter develops over time, once fastening has been carried out.

Preferably, the UHF identification system is a radio-frequency identification (RFID) system.

In other words, the invention consists in defining an electronic animal tag of two pieces, one incorporating the UHF, and preferably RFID, electronic identification portion, the other incorporating means that will press the UHF portion against the ear of an animal and keep it pressed there throughout its lifetime.

Thus, the UHF portion initially pressed against an ear of an animal will remain so whatever the growth or morphological development of the animal and therefore of its ear to which the electronic tag is fastened.

The solution according to the invention allows performance with respect to transmission of UHF signals, and preferably RFID signals, to be entirely maintained throughout the life of the animal.

During tests, the inventor observed that the propagation of the UHF waves transmitted/received by an identification portion incorporated into a tag may be modified on the one hand by the integration method itself, in particular when it is an encapsulation method, and on the other hand considerably by the distance of the identification portion relative to the ear of the animal.

Thus, the inventor thought to press the UHF identification portion against the ear, so that the surface of the ear of the animal, in which the presence of a substantial amount of water, which is a very good conductor, guarantees that the working frequency is maintained, and hence the transmitted/received signals reflected by the UHF portion are weakly attenuated overall, and that the orientation of the signals would be well-defined.

Furthermore, by guaranteeing, during the development of the animal, that contact is maintained between the UHF portion and the surface of the ear, transmission performance is entirely maintained.

Consequently, the invention makes it possible to guarantee systematic individual traceability of an animal, in particular within a herd, throughout the life of the animal.

The design of the UHF portion, which preferably takes the form of a thin film bearing an electronic chip and its antenna, and its integration into the base of the male portion of the ear tag according to the invention, have the particular advantage of a high compactness with a lower weight.

According to one advantageous embodiment, the male portion or the female portion comprises at least one elastic compressing means for keeping the UHF portion pressed against the ear.

According to this embodiment, one advantageous variant of embodiment consists in the female portion consisting of a single plastic part of generally frustoconical shape in which at least one through-aperture that extends along the generatrix of the conical frustum is produced so as to form at least one conical-spring turn segment.

Advantageously, the plastic part comprises three conical-spring turn segments that lie parallel to one another along the generatrix.

Preferably, the material from which the part is made is chosen from polyamide (PA), polypropylene (PP), thermoplastic polyurethane (TPU) or a combination thereof.

According to one advantageous variant, the male portion comprises a flat base that houses the UHF portion and to which is fastened the end of the shaft opposite the tip.

Preferably, the flat base is made from two flat plastic parts that are joined together by adhesive bonding or welding, so as to define a seal-tight interior cavity inside of which the UHF portion is housed.

It is possible to provide two ultrasonic-welding energy vectors or two O-rings arranged between the two flat parts, bounding therewith the seal-tight interior cavity.

As the elastic compressing means, any one of the following variants may advantageously be envisioned instead of the plastic part of frustoconical shape:

- a spring of generally flared shape, said spring being securely fastened to the base of the male portion and being arranged around the shaft;
- a spring of generally toroidal shape, said spring being securely fastened to the shaft and being arranged therearound
- a helical spring, said spring being securely fastened to the base of the male portion and being arranged around the shaft.

According to one advantageous feature, the UHF portion incorporated into the male portion consists of a UHF send/receive spectrum antenna and of a microchip connected to the spectrum, said antenna and microchip being adhesively bonded to, etched into or welded to a film of polyethylene terephthalate or being incorporated into an area configured to bear an electronic component of PCB type (PCB being the acronym of printed circuit board).

A further subject of the invention is a herd radio-frequency identification system comprising a fixed reader/transmitter, configured to read/transmit radio-frequency signals to any of a plurality of identification ear tags as described above, each ear tag being fastened to an ear of a separate animal of the herd.

Lastly, one subject of the invention is a method for reusing a portion of the identification ear tag as described above, comprising the following steps:

- removing the identification tag of a first animal;
- retrieving the male portion or the female portion incorporating the UHF identification portion;
- re-encoding the UHF identification portion in order to identify a second animal;
- fastening an identification tag to the second animal by means of a new female or male portion devoid of the UHF portion, and by means of the retrieved male or female portion with the re-encoded UHF portion, respectively.

Other advantages and features of the invention will become more clearly apparent on reading the detailed description of examples of implementation of the invention, which description is given, by way of illustration and non-limitingly, with reference to the following figures.

DETAILED DESCRIPTION

Figure 1:
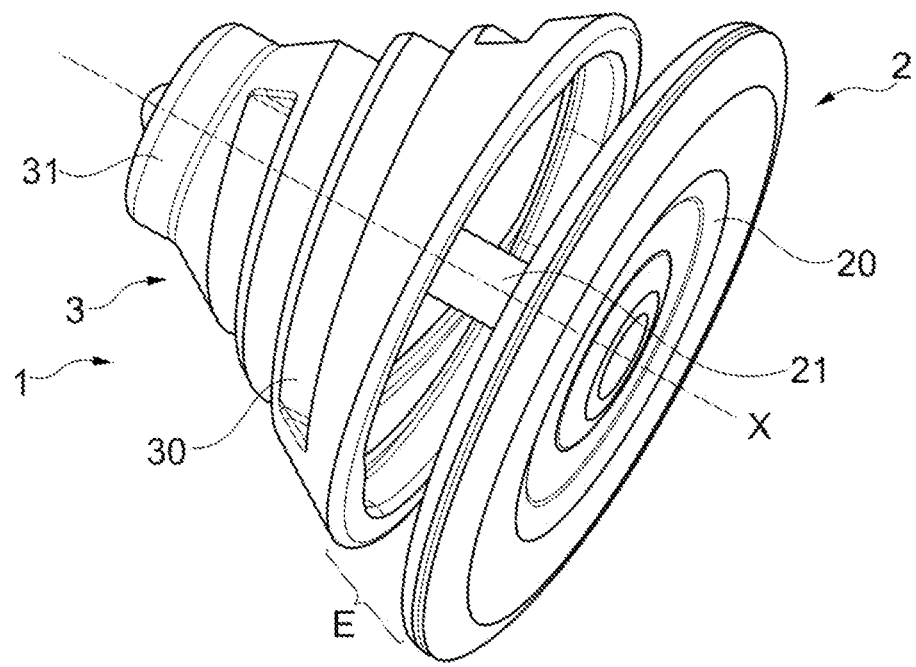
FIG. 1 is a view is a perspective view of an example of an electronic animal identification tag according to the invention in its assembled configuration, the female portion of the tag being in its rest position.

As illustrated in FIGS. 1, 2, 2A and 3, an RFID identification ear tag, i.e. a so-called electronic tag, which is generally designated by the reference 1, comprises a plastic male part 2 and a plastic female part 3, the latter being configured to be fastened to the male part.

The male part 2 comprises a flat base 20, of generally circular shape, and a shaft 21 that is securely fastened to the base 20.

In the illustrated example, the flat base 20 is made from two portions 22, 23 that are joined together by welding or adhesive bonding, so as to define a seal-tight cavity 24 therebetween.

Inside this seal-tight cavity 24 is housed one portion of an RFID identification system 10. This RFID portion comprises a UHF send/receive spectrum antenna and a microchip connected to the spectrum, said antenna and microchip being adhesively bonded to, etched into or welded to a film 11 made of polyethylene terephthalate (PET). This PET film 11 bearing the antenna and the microchip is therefore inserted between the two portions 22, 23 before they are joined together, which makes it possible to hold it in place, in particular by means of a plurality of holding pins 220 that are integrally formed by molding with the rest of portion 22 and that protrude toward and bear against the portion 23. As may be seen in FIG. 3, the PET film 11 takes the form of a thin disc pierced in its center for passage of the shaft 21.

Figure 2:
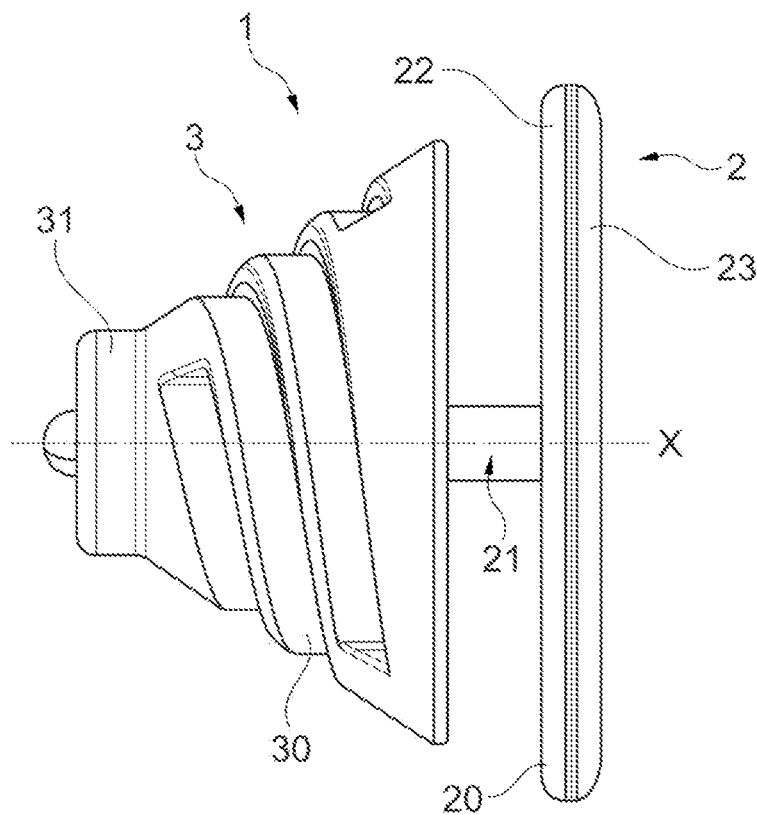
FIG. 2 is a side view of the tag in FIG. 1.
Figure 2A:
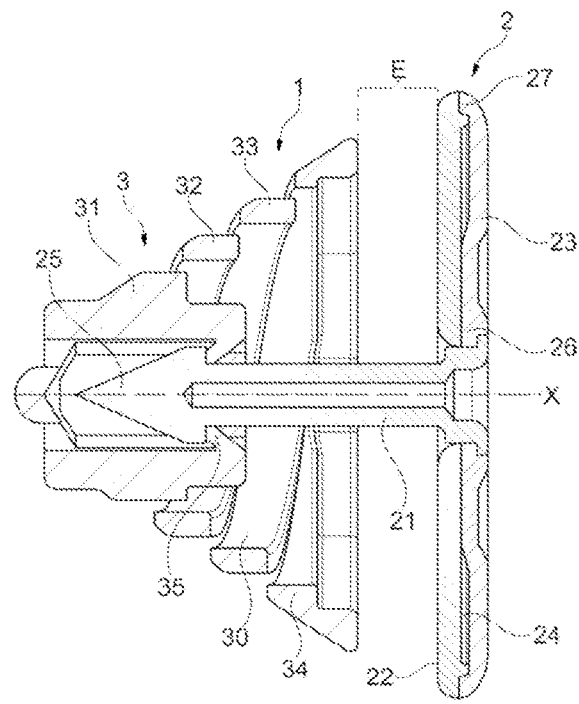
FIG. 2A is a longitudinal cross-sectional view of the ear tag in FIG. 2.
Figure 3:
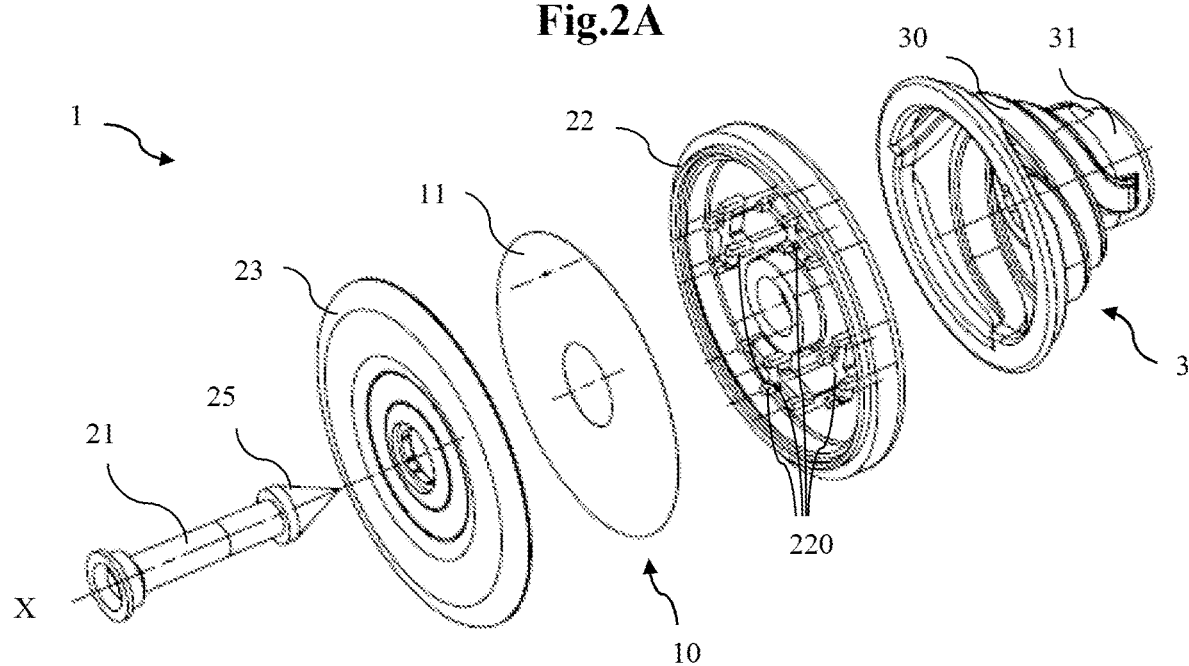
FIG. 3 is an exploded view of the ear tag in FIGS. 1 to 2A.
Figure 4:
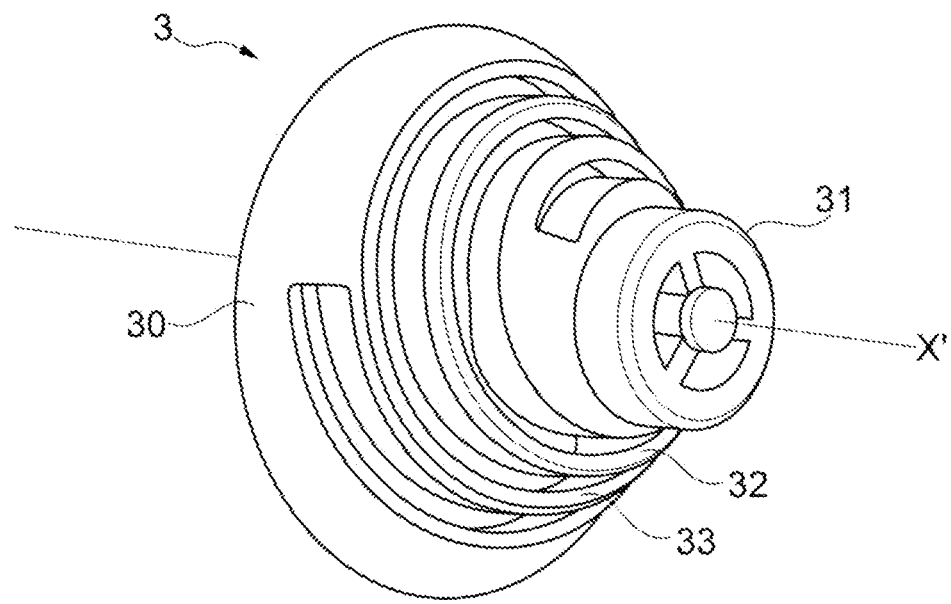
FIG. 4 is a perspective view of an example of the female part of the ear tag in FIGS. 1 to 3.
Figure 5:
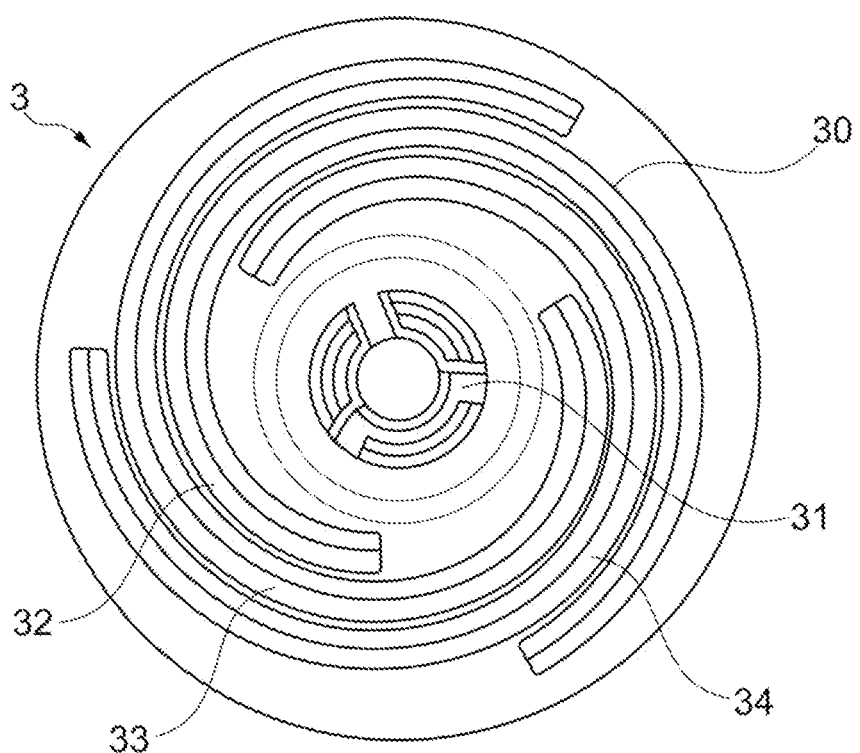
FIG. 5 is a front view of the female part in FIG. 4.

As may be seen in FIG. 2A, the shaft 21 is securely fastened, by one of its ends, to the center of the portion 23 of the flat base 20.

The opposite end of the shaft is shaped into a tip 25 that is configured to pierce and to fasten the tag to the ear of an animal.

In order to perfect the seal-tightness of the cavity 24 and therefore to better protect the RFID portion inside, two ultrasonic-welding energy vectors 26, 27 are arranged between the two portions 22, 23 before they are joined together ultrasonic welding. In the case where the joining operation consists in fastening mechanically, it is advantageously possible to envision using O-rings instead of the energy vectors 26, 27.

In the illustrated example, the shaft 21 and the portions 22, 23 are made of polyamide (PA), and preferably machined polyamide. They may also be made of thermoplastic polyurethane (TPU), or of polypropylene (PP).

As regards the female part 3, it comprises a base 30 of generally frustoconical shape and a cylindrical end fitting 31 that is connected to the small diameter of the base 30.

Three through-apertures that lie parallel to one another and that each extend along the generatrix of the conical frustum 30 have been produced in the latter.

Each strip of plastic thus formed constitutes a conical-spring turn segment 32, 33, 34. The fundamental advantage of having a female part consisting of a single conical spring is that the axial height of the part may be small (with a lower weight), this being desirable for a tag to be fastened to an animal ear. When the geometry used comprises three turns 32, 33, 34, the conical spring may be compressed until it has a length close to the thickness of one turn 32, 33, 34.

In other words, the compression travel of the spring 30, when the turns 32, 33, 34 nest in one another, may be large. Typically, the difference between the height of the spring at rest and the minimum height may be about 6 mm.

Figure 6:
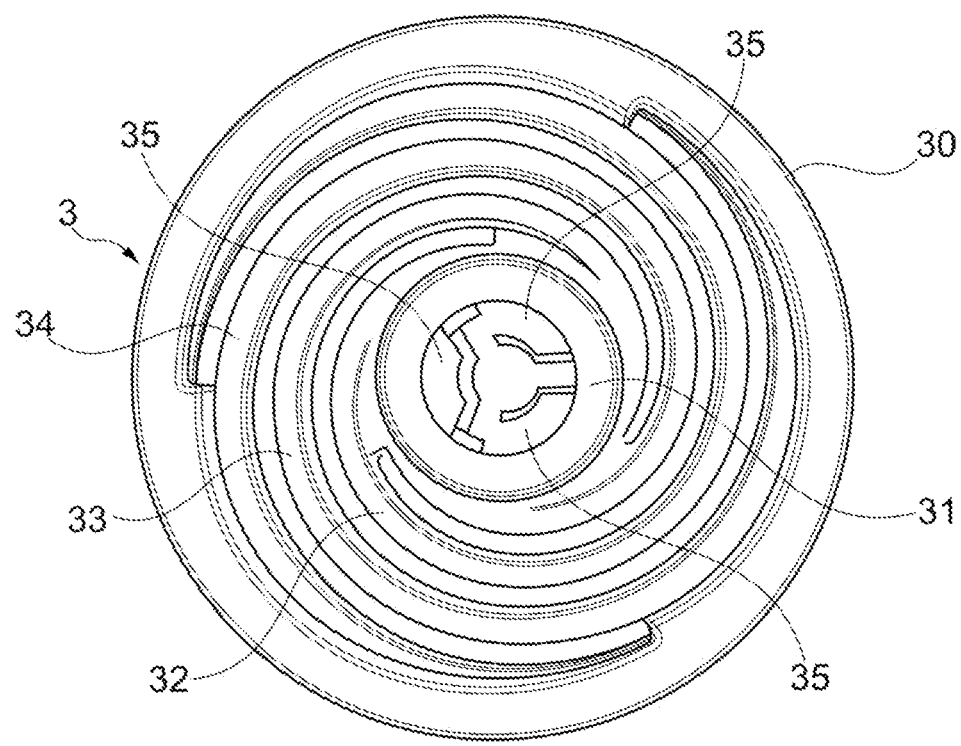
FIG. 6 is a rear view of the female part in FIG. 4.

As shown in FIGS. 2A and 6, the end fitting 31, which is hollow internally, comprises retaining lips 35, the function of which is to retain the tip 25 of the shaft 20 when the latter is inserted into the end fitting 31, this therefore allowing the female part 3 to be kept joined to the male part 2, regardless of the compressive stress experienced by the spring 30.

When dimensioning the female part 3 according to the invention, care is taken to ensure that the height of the spring 30 at rest leaves a free space E of a sufficient height to guarantee that, as soon as the electronic tag 1 has been fastened in place, the base 20, and therefore the RFID portion housed in the cavity 24, presses against the ear (O) of an animal.

As the animal grows, the spring 3 will get compressed by the turns 32, 33, 34, which begin to nest in one another, and will ensure a contact force is applied against a surface of the ear (O), this guaranteeing application of a force that will press the base 20 against the surface of the ear, opposite the surface making contact with the female part 3.

In the context of the invention, as the conical spring 30 may compress over a large height, it is guaranteed that a force will press the base 20 against the ear (O) even should the animal's ear (O) to which the electronic tag 1 is fastened experience a very substantial amount of growth.

By way of example, the minimum space E between the base 20 of the male part 2 and the base 20 of the female part 3, corresponding to a rest state of the conical spring 3, may be about 5 mm (FIG. 2A).

In contrast, the maximum available space between the base 20 of the male part 2 and the base 20 of the female part 3, corresponding to a state of maximum compression of the conical spring 3, may be about 12 mm.

To simultaneously fasten the male part 2 to the ear (O) of an animal using the tip 25 of the shaft 21 which pierces said ear, and join the male part 2 and female part 3, a suitable pair of pliers may be used.

Figure 7:
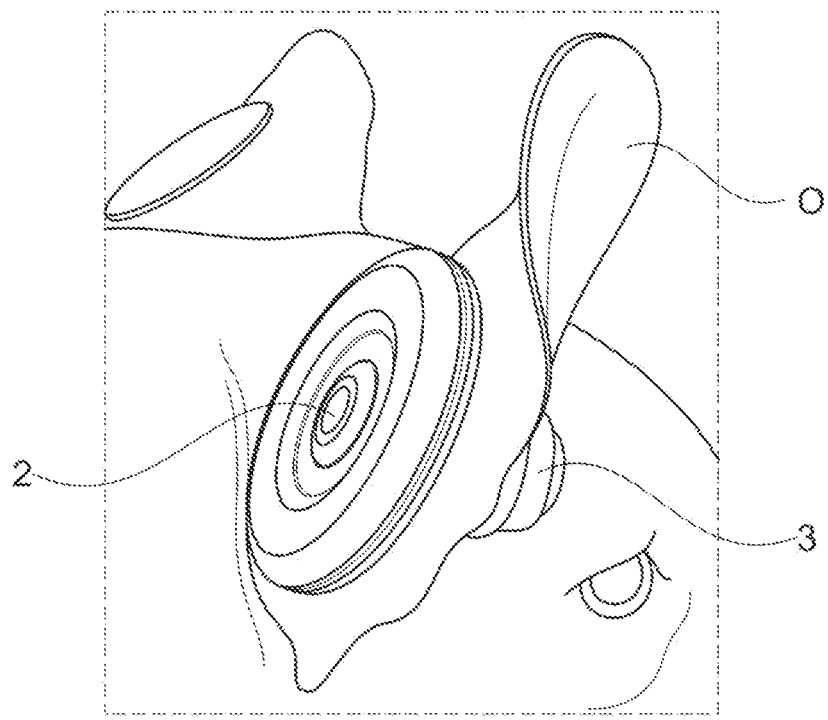
FIG. 7 is a photographic reproduction of an electronic identification tag according to the invention as it is when fastened to an ear of a herd pig.
Figure 8:
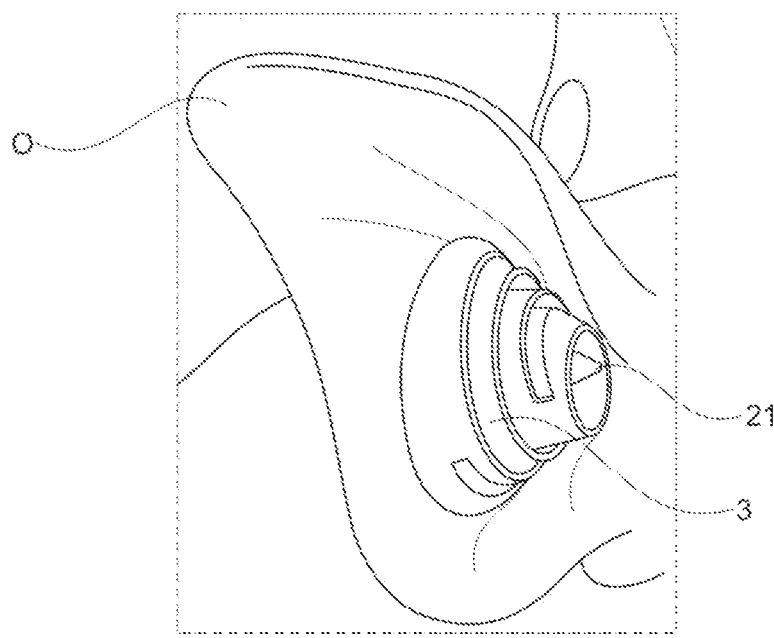
FIG. 8 is a photographic reproduction of an electronic identification tag according to the invention as it is when fastened to an ear of a herd pig.
Figure 9:
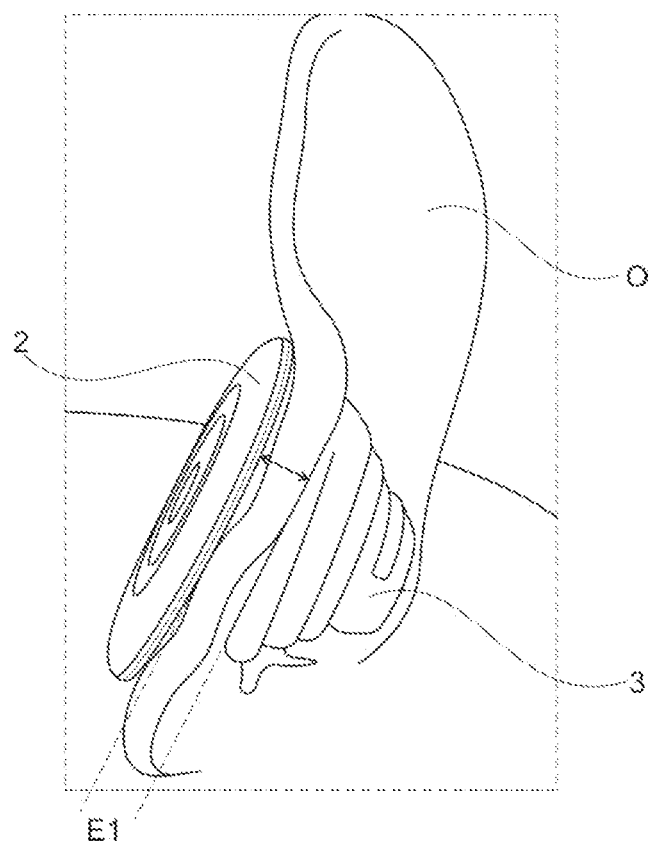
FIG. 9 is a photographic reproduction of an electronic identification tag according to the invention as it is when fastened to an ear of a herd pig.

FIGS. 7 to 9 show an electronic tag 1 fastened to an animal ear (O), with the spring 30 in a state of intermediate compression between its rest state and its state of maximum compression. By way of example, in this state of intermediate compression, the electronic tag 1 presses against either side of an ear (O) of thickness E1 of about 10 mm (FIG. 9).

The inventor has carried out performance trials on a plurality of electronic tags 1 that have just been described and which were attached to a certain number of pigs of different sizes and/or weights.

Firstly, it was observed that attachment of the tags 1 had not caused any redness or any infection, neither as regards the hole pierced by the tip 21 of the tag, nor as regards any irritations that might occur.

Furthermore, it was observed that 100% of the tags remained mechanically held, and that 100% of the RFID information transmitted by the tags 1 could be read with a manual reader.

Other variants and advantages of the invention may be utilized without however departing from the scope of the invention.

An electronic identification tag as has just been described may equally well be fastened to an ear of a pig, of a sheep, of a bovine or even of a goat or indeed of any other type of domestic animal.

An electronic identification tag according to the invention remains functional regardless of the growth of the animal that is provided with it. It is thus able to adapt to increases in animal-ear thickness, which is typically from 5 to 12 mm for pigs, and 5 to 10 mm for cattle, sheep and goats.

The Applicant has carried out trials to highlight the detection efficiency obtained with electronic tags according to the invention.

These trials consisted in measuring the received signal strength indicator (RSSI) transmitted by tags worn by a group of pigs (A).

Figure 10:
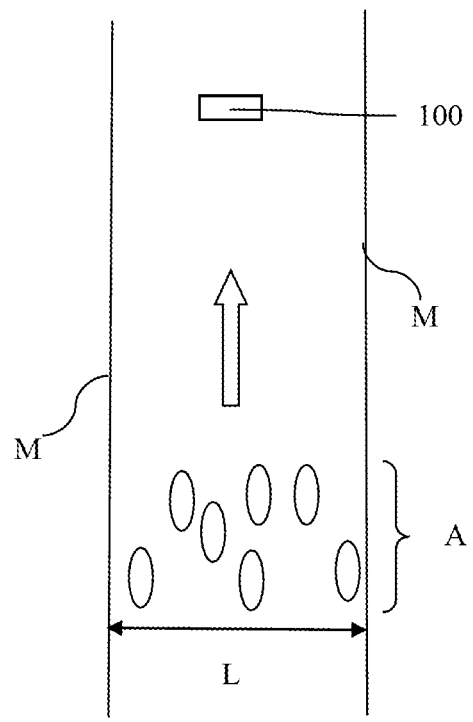
FIG. 10 is a top view of a testing alley in which received signal strength indicator measurements for animal-worn electronic identification tags both according to the invention and, for the sake of comparison, according to the prior art.
Figure 11:
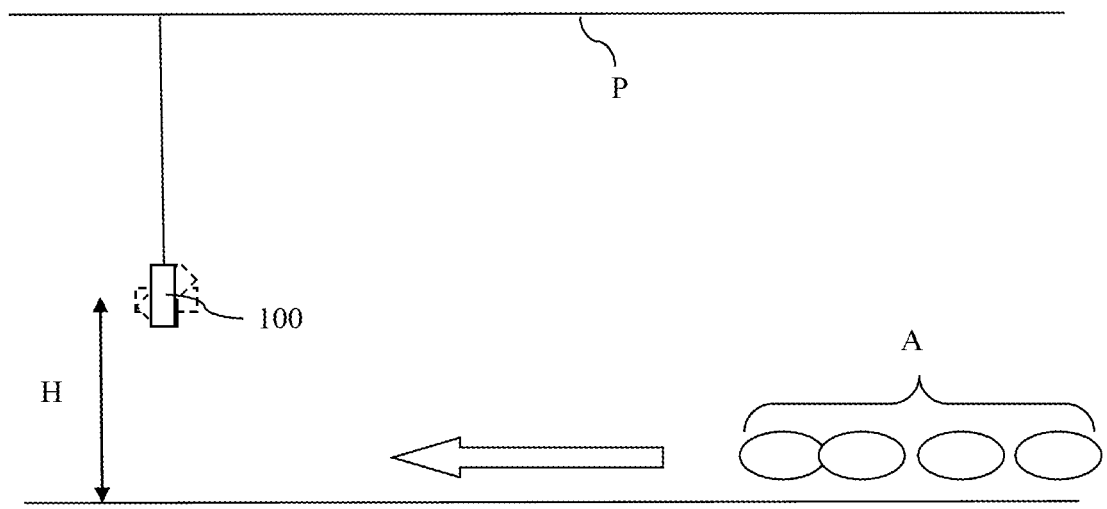
FIG. 11 is a side view of the testing alley in FIG. 10.

FIGS. 10 and 11 show the environment in which the trials were carried out.

It is a question of an alley between the walls (M) of which some of the group of pigs (A) are wearing, on one of their ears, electronic identification tags according to the invention, and the rest of the group of pigs are wearing, on one of their ears, an electronic identification tag according to the prior art. It will be noted that this alley was not intentionally, specially fitted out for the trials.

Thus, metal parts, plastic parts and electrical hardware were all present in the alley. These components may have an impact on the behavior of the RF waves, but the impact was the same for all the identification tags tested.

More precisely, the identification tag according to the prior art was that sold by the company Luoyang Laipson Information Technology CO., Ltd, under the commercial reference UF202, which is capable of transmitting signals in the 860-960 mHz range.

A detection antenna 100 configured to detect UHF signals was suspended from the ceiling (P) of the alley.

More precisely, the detection antenna 100 was located at a height of 80 cm from the ground (S), when it was in a substantially horizontal position. The corridor moreover had a width (L) of about 1.5 m.

The antenna 100 had a configurable maximum power of 29 dBm.

The trials therefore consisted in making the pigs, each equipped with at least one electronic identification tag, run through the alley in the direction symbolized by the arrow in FIGS. 10 and 11, so as to allow the animals to be counted then, for each identified tag, the RSSI power level to be recorded for various inclinations, 90°/45°/0°, of the antenna 100 with respect to a vertical axis, as symbolized by the dashed and solid lines in FIG. 11, respectively.

The results obtained are collated in the table below.

TABLE

| | | Inclination of the detection antenna | | | |
|---|---|---|---|---|---|
| | | 0° | 0° | 45° | 90° |
| % of tags detected | Prior art | 100 | 100 | 100 | 100 |
| | Invention | 80 | 90 | 100 | 100 |
| Average RSSI of the tags in dBm | Prior art | −68.7 | −69.4 | −69.6 | −63.1 |
| | Invention | −62.2 | −59.7 | −58.9 | −54.7 |

From this table, it may clearly be seen that:
- a configuration in which the detection antenna 100 is at 90° with respect to the ground seems to be the most favorable position because it is in this configuration that the RSSI is highest for a tag according to the invention;
- the average RSSI is higher for the tags according to the invention than for the tags according to the prior art. This tendency is also observed for animals wearing both an identification tag according to the prior art and an identification tag according to the invention.

Figure 12:
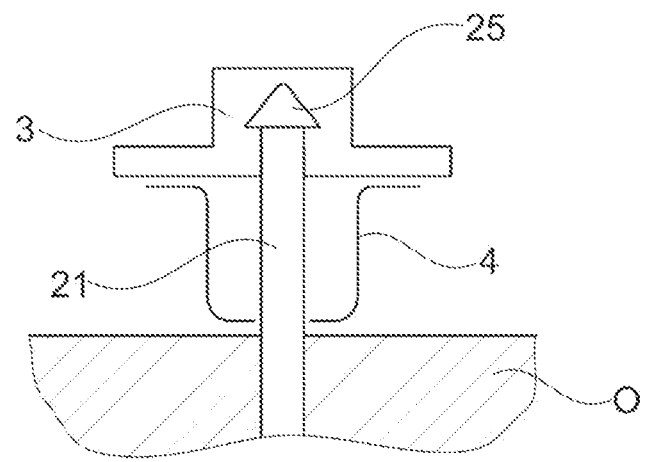
FIG. 12 illustrates a schematic longitudinal cross-sectional view of a first variant spring shape for pressing the UHF identification portion, which portion is securely fastened to the male portion of an electronic identification tag according to the invention.
Figure 13:
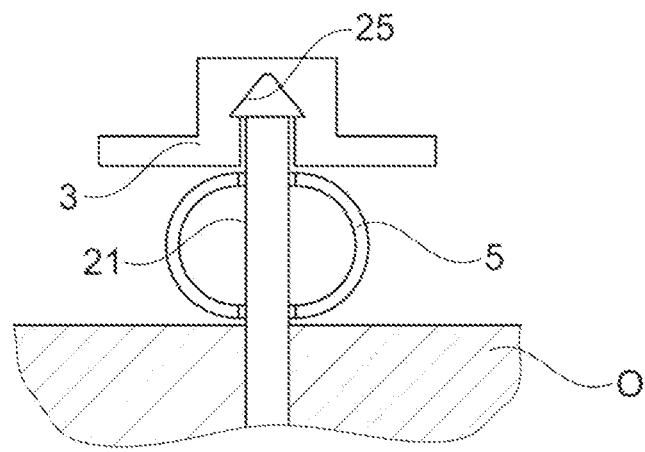
FIG. 13 illustrates a schematic longitudinal cross-sectional view of a second variant spring shape for pressing the UHF identification portion, which portion is securely fastened to the male portion of an electronic identification tag according to the invention.
Figure 14:
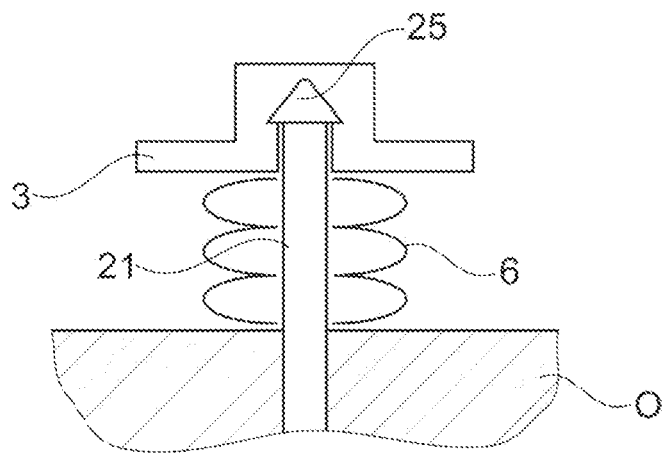
FIG. 14 illustrates a schematic longitudinal cross-sectional view of a third variant spring shape for pressing the UHF identification portion, which portion is securely fastened to the male portion of an electronic identification tag according to the invention.

Measurements were also carried out on pigs wearing an identification tag according to the invention, but with the flat base 20 intentionally detached from the ear of the animal. It was observed that, in a configuration in which the detection antenna 100 was vertical, these tags "detached" from the ear could not be detected by the antenna 100. Although in the examples illustrated in FIGS. 1 to 9, the UHF identification portion was pressed into place by a spring that formed an integral portion of the female portion 3 of the identification tag according to the invention, it is quite possible to envision a spring with the pressing function being incorporated into or securely fastened to the male portion 2. Thus, for example, it is possible to employ:
- a spring 4 of generally flared shape, said spring being securely fastened to the base 20 of the male portion and being arranged around the shaft 21 (FIG. 12);
- a spring 5 of generally toroidal shape, said spring being securely fastened to the shaft 21 and being arranged therearound (FIG. 13);
- a helical spring 6, said spring being securely fastened to the base 20 of the male portion and being arranged around the shaft 21 (FIG. 14).

The invention is not limited to the examples that have just been described; features of the illustrated examples may in particular be combined with one another in unillustrated variants.

Other variants and improvements may be envisioned without however departing from the scope of the invention.

The invention claimed is:

1. An identification ear tag for animals, comprising:
    a male portion comprising a shaft with a tip configured to configured to pierce an animal ear and to fasten the tag to the ear;
    a female portion, intended to be fastened around the shaft, wherein:
    the male portion or the female portion incorporates one portion of a UHF identification system and
    the male portion or the female portion is configured to press said portion of the UHF identification system against the ear of the animal during fastening of the tip, and to keep said portion of the UHF identification system pressed against the ear, without exterior intervention, no matter how said ear develops over time, once fastening has been carried out, wherein the male portion or the female portion comprises at least one elastic compressing means for keeping said portion of the UHF identification system pressed against the ear, and wherein the female portion consists of a single plastic part of generally frustoconical shape in which at least one through-aperture that extends along the generatrix of the conical frustum is produced so as to form at least one conical-spring turn segment.

2. The identification ear tag as claimed in claim 1, wherein the UHF identification system is a radio-frequency identification (RFID) system.

3. The identification ear tag as claimed in claim 1, wherein the plastic part comprises three conical-spring turn segments that lie parallel to one another along the generatrix.

4. The identification ear tag as claimed in claim 1, wherein the material from which the part is made is chosen from polyamide (PA), polypropylene (PP), thermoplastic polyurethane (TPU) or a combination thereof.

5. The identification ear tag as claimed in claim 1, wherein the male portion comprises a flat base that houses the UHF portion and to which is fastened the end of the shaft opposite the tip.

6. The identification ear tag as claimed in claim 3, wherein the flat base is made from two flat plastic parts that are joined together by adhesive bonding or welding, so as to define a seal-tight interior cavity inside of which the UHF portion is housed.

7. The identification ear tag as claimed in claim 4, comprising two ultrasonic-welding energy vectors or two O-rings arranged between the two flat parts, bounding therewith the seal-tight interior cavity.

8. The identification ear tag as claimed in claim 1, comprising, as elastic compressing means, a spring of generally flared shape, said spring being securely fastened to the base of the male portion and being arranged around the shaft.

9. The identification ear tag as claimed in claim 1, comprising, as elastic compressing means, a spring of generally toroidal shape, said spring being securely fastened to the shaft and being arranged therearound.

10. The identification ear tag as claimed in claim 1, comprising, as elastic compressing means, a helical spring, said spring being securely fastened to the base of the male portion and being arranged around the shaft.

11. The identification ear tag as claimed in claim 1, wherein the UHF portion incorporated into the male portion consists of a UHF send/receive spectrum antenna and of a microchip connected to the spectrum, said antenna and microchip being adhesively bonded to, etched into or welded to a film of polyethylene terephthalate (PET) or being incorporated into an area configured to bear an electronic component of PCB type.

12. A herd radio-frequency identification system comprising a fixed reader/transmitter, configured to read/transmit radio-frequency signals to any of a plurality of identification ear tags as claimed in claim 1, each ear tag being fastened to an ear of a separate animal of the herd.

13. Method for reusing a portion of the identification ear tag as claimed in claim 1, comprising the following steps:
remove the identification tag of a first animal;
retrieving the male portion or the female portion incorporating the UHF identification portion;
re-encoding the UHF identification portion in order to identify a second animal;
fastening an identification tag to the second animal by means of a new female or male portion devoid of the UHF portion, and by means of the retrieved male or female portion with the re-encoded UHF portion, respectively.

* * * * *